July 26, 1966 W. J. DE GAIN 3,262,541
DRIVE MEANS FOR A TRANSFER MECHANISM
Filed Jan. 17, 1964 3 Sheets-Sheet 1
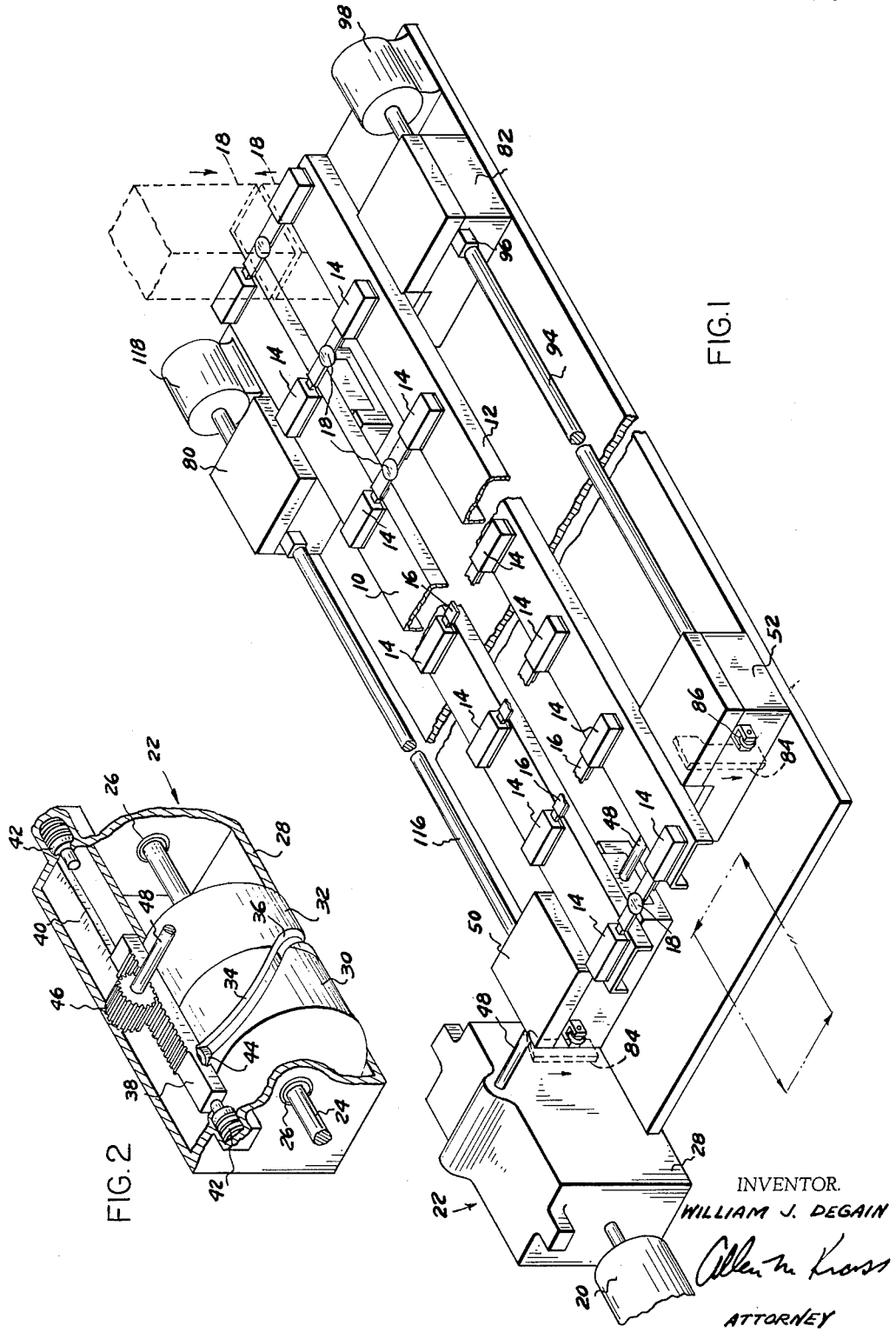
INVENTOR.
WILLIAM J. DEGAIN
ATTORNEY

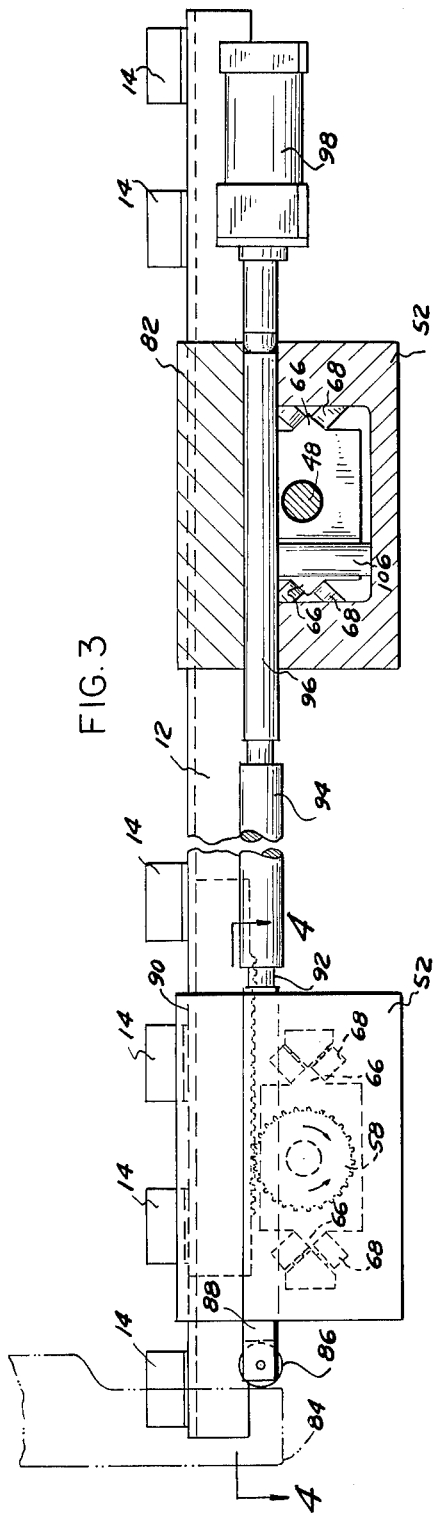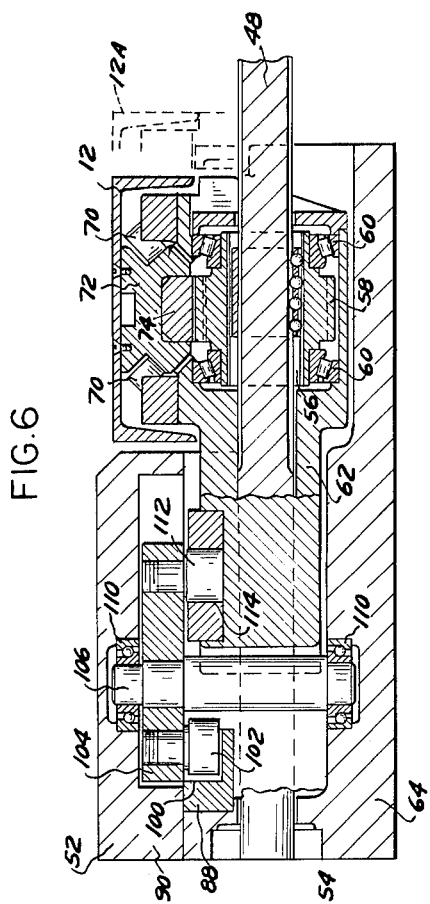

July 26, 1966  W. J. DE GAIN  3,262,541
DRIVE MEANS FOR A TRANSFER MECHANISM
Filed Jan. 17, 1964  3 Sheets-Sheet 3

INVENTOR.
WILLIAM J. DEGAIN
BY
ATTORNEY

United States Patent Office 3,262,541
Patented July 26, 1966

3,262,541
DRIVE MEANS FOR A TRANSFER MECHANISM
William J. De Gain, Detroit, Mich., assignor to Koppy Tool & Die Company, Ferndale, Mich., a corporation of Michigan
Filed Jan. 17, 1964, Ser. No. 338,337
5 Claims. (Cl. 198—19)

This invention relates to a drive for a mechanism for transferring workpieces through a series of stations which are equidistant from one another and more particularly to such a mechanism which may be applied to a progressive pressing operation wherein a succession of operations are performed on parts at the various stations by sets of dies associated with a single press.

Mechanism of the type which employ a plurality of sets of fingers disposed on opposing sides of a pair of parallel transfer bars are commonly employed in automatic metalworking operations. The two bars are moved toward one another laterally so that the sets of fingers engage workpieces and the bars are then moved axially to transfer each workpiece to a certain successive station. The bars then separate and return axially to their original position. Such transfer mechanisms may be used to move a series of parts through a furnace or through other controlled environments as well as to move the parts through a series of machining or forming operations. Such mechanisms provide relatively low cost transfer because one drive system is employed to power a series of motions between successive points.

The present invention has as its primary object to provide a reciprocating bar transfer mechanism which is highly reliable in operation and simple in construction. The preferred embodiment of this invention, which will subsequently be described in detail, employs a reciprocating drive mechanism powered from the rotary drive of the associated operating press or machine to provide the axial motion of the set of parallel transfer bars. The preferred form of the reciprocating drive mechanism uses a drum cam split in two parts which may be adjusted to one another, so as to control the distance between the two extremes of the axial motion of the transfer bars. The cam is designed with an acceleration and de-acceleration pattern that minimizes the jerk imposed on the fingers and workpieces and provides a minimum inertial build-up in the bars.

Lateral reciprocation of the transfer bars toward and away from one another is, in the preferred embodiment of the invention, powered by a cam attached to the ram of the operating press. The cam acts against one end of a rod which is aligned with the transfer bar so as to move the rod axially in response to the ram movement. The rod is pressed against the cam by an air cylinder which acts in the manner of a spring to maintain a force against the cam. This rod connects to linkage members disposed at at least each end of the transfer bars. The linkages transfer the axial motion of the rod into a reciprocating motion lateral to the axis of the transfer bars. The motion of the rod which brings the transfer bars together is in the direction of the extension of the rod and air cylinder so that a sufficient force in opposition to the closing of the fingers will prevent the air cylinder from continuing the closing motion. The tie-in between the two ends of the transfer bars prevents the bars from cocking and jamming in the event one pair of fingers meets a closing resistance. The rotational input to the reciprocating axial drive mechanism is adjusted with respect to the motion of the press ram so that the two motions are produced in the proper synchronism.

It is therefore seen to be a primary object of the present invention to provide a drive mechanism for a pair of parallel transfer bars wherein the axial reciprocation is produced through a positive drive mechanism in timed relation to the operation associated machine and the lateral drive is produced by a mechanism driven by the associated machine itself and is so devised that the jamming of the fingers will prevent the closing of bars.

Another object is to provide a drive system which is simple in construction and which may be halted at any point in its motion cycle and restarted without creating undesirable loads or pressures on the operating mechanism.

Other advantages, applications and objects of the present invention will be made apparent by the following detailed description of the preferred embodiment of the invention. The description makes reference to the accompanying drawing in which:

FIGURE 1 is a perspective view of a pair of transfer bars and their associated drive mechanism, broken away in the center to simplify the drawing;

FIGURE 2 is a perspective view of the interior of the barrel cam reciprocating drive with the cover broken away;

FIGURE 3 is a side view of the drive of FIGURE 1, broken at various sections to show the detail of the mechanism;

FIGURE 6 is a lateral sectional view of one of the slave units taken along line 6—6 of FIG. 4.

Figure 4:
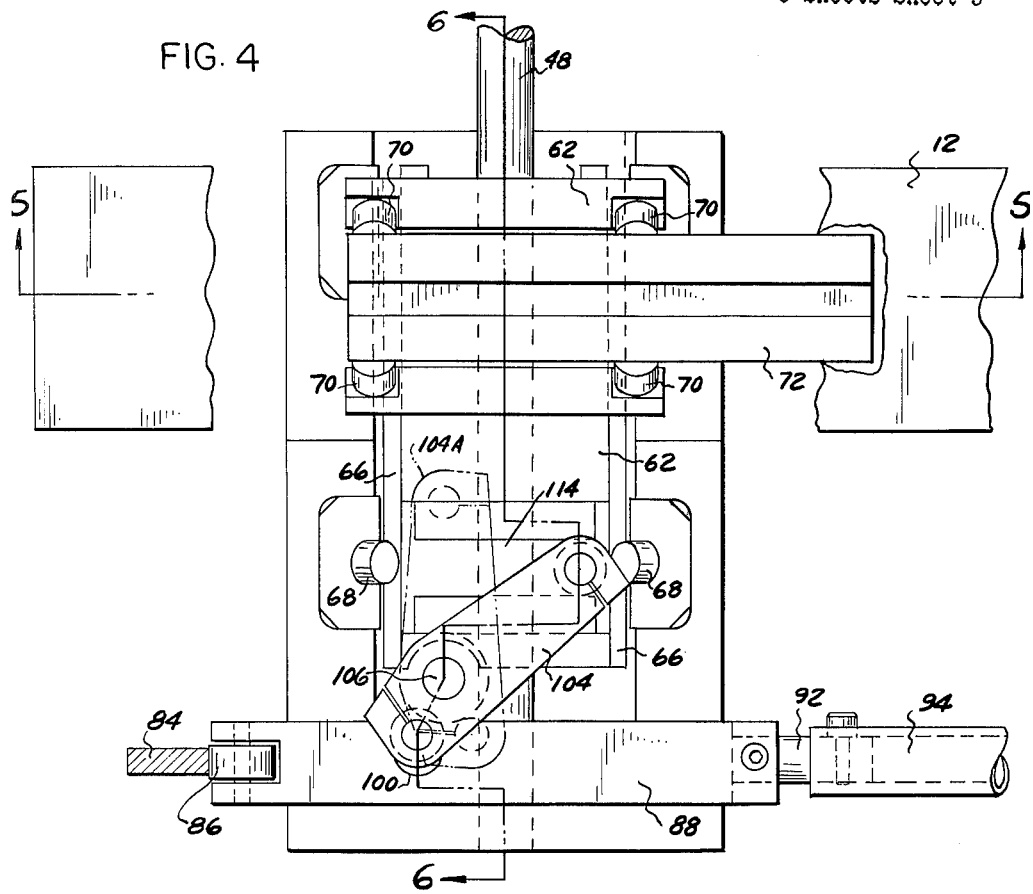
FIGURE 4 is a top view of one slave unit of the mechanism with the cover removed.

Referring to the drawings, a pair of transfer bars 10 and 12 formed of channel sections with their channels downturned are disposed parallel to one another. The bars 10 and 12 support a plurality of sets of work-engaging fingers 14 arranged at regular intervals along the lengths of the bars with two members of a set in direct opposition to one another. Each of the fingers 14 supports a finger bar 16 which is directed toward the associated finger bar 16 on the opposing transfer bar. The finger bars 16 are resiliently supported within the fingers 14 so that when they are brought together by a lateral movement of the transfer bars 10 and 12 toward one another, their extreme ends will grasp a workpiece such as the circular member 18 shown in FIGURE 1. A design for fingers which might be employed in connection with the present invention is disclosed in U.S. patent application Serial No. 271,312, now Patent No. 3,151,735 and dated October 6, 1964, by the present inventor, filed April 8, 1963. However, any form of work-engaging finger which projects from bar 10 and 12 so as to grasp workpieces may be employed with this invention.

The function of the drive, which forms the subject matter of the present invention, is to move the transfer bars 10 and 12 along a generally rectangular path in the horizontal plane which consists of a motion of the bars toward one another; an axial translation of the bars; a motion of the bars away from one another; and an axial translation back to the original point of the path. The length of the axial motions are equal to the distance between adjacent sets of fingers 14. While undergoing such a motion, the work-engaging fingers 14 grasp a workpiece as the two transfer bars move together, move it to an advanced position as the bars move axially, drop the part in its new position as the bars move apart, and then return to their original location. Such a transfer mechanism is useful in connection with a variety of automatic equipment and the preferred embodiment is intended to be used in connection with a multiple station press wherein dies form a progressive series of operations on a piece as it is moved through the press. In the preferred embodiment a pair of press-operated dies indicated at 18 have been illustrated to typify the die sets which would operate upon the part at each of the positions. The transfer mechanism might also be employed in connection with a non-progressive operation such as a furnace where it is desired to move the parts through the furnace at a relatively constant rate.

In the preferred embodiment of the invention the power for the axial reciprocation of the transfer bars 10 and 12 is obtained from a rotary power source 20 which preferably comprises or is tied in with the powering unit for the machine being serviced by the transfer mechanism. The power unit 20 may constitute the motor which drives the press 18. This assures that the axial motion of the transfer bars 10 and 12 will occur in a timed relation to the lowering of the press. The uni-directional rotational motion of the power drive 20, which may occur continuously or intermittently, is transformed into reciprocating rotational motion by a drive unit generally indicated at 22. The power source 20 couples to the drive unit 22 by means of a shaft 24 which is journaled in a pair of bearings 26 supported at opposite ends of a reciprocating drive housing 28.

Two halves 30 and 32 of a split drum cam are supported on the shaft 24 within the housing 28. The two drum halves 30 and 32 have cam tracks 34 and 36 formed in their barrel surfaces which join when the two halves are properly disposed with respect to one another to form a continuous path. The space between the two cam halves 30 and 32 may be adjusted by a small amount so as to vary the distance between the two dwells on the cam track 34, 36. This adjustment must not exceed the gap that a cam follower may bridge without producing a jerk in the unit's output.

A gear-tooth rack member 38 is supported for sliding motion in the direction axial to the shaft by gibs 40, supported within the housing 28. The rack 38 slides between the extreme edges of the housing 28 and a pair of spring loaded stop members 42 supported at opposite sides of the housing 28 abut the rack at each extreme of its travel. The rack 38 rotatably supports a cam follower 44 on its lower surface, which follower is disposed within the tracks 34 and 36 of the barrel cam halves. The spring stops 42 force the follower 44 against the interior side of the walls of the cam track 34. The cam track 34 is so designed that as the shaft 24 is rotated, the rack 38 will reciprocate between the two limits of its travel and will dwell at each end. The exact distance between the two dwells is adjusted by rotating the cam halves 30 and 32 with respect to one another through small distances.

The reciprocation of the rack 38 is transmitted to an output pinion 46 which is journaled within the housing 28 and to its shaft 48. The output shaft 48 therefore undergoes a rotational reciprocation with a dwell at each extreme of its travel as the power unit 20 drives the input shaft 24. The design of the cam track 34 is such that the rotational output movement accelerates and de-accelerates smoothly between its dwells in a curve which minimizes jerk.

Figure 5:
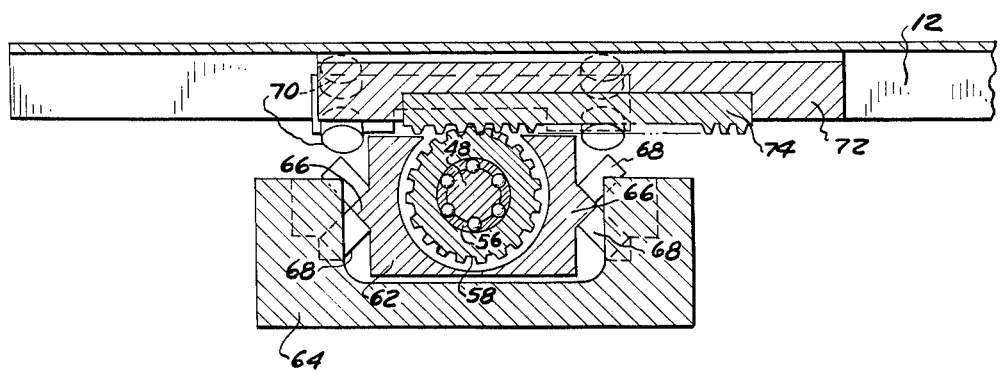
FIGURE 5 is a transverse cross-section view through one of the slave units taken along line 5—5 of FIG. 4.

The reciprocating rotation shaft 48 connects to a pair of lateral drive boxes 50 and 52. In FIGURES 4, 5 and 6 the interior construction of the box 52 is disclosed. The box 50 is substantially similar to the box 52 except that it is laid out in reverse order as will be subsequently noted. The shaft 48 passes through the box 50 and into the box 52. Its end is journaled in a bearing 54 disposed at the extreme end of box 52. This is best seen in FIGURE 6. Within the box 52 a ball spline 56 formed on the shaft 48 engages a spline formed on the internal diameter of a gear 58. The ball spline 56 allows the rotation of the shaft 48 to be communicated to the gear 58 and also allows axial reciprocation of the gear 58 with respect to the shaft. The gear 58 is journaled in two sets of roller bearings 60 formed in a cavity of a slide member 62. The slide member 62 is supported on the base 64 of the drive box 52 by means of gibs 66 which are journaled in sets of right angle support rollers 68. The support rollers 68 are rotatably suspended in the sidewalls of the base 64.

One of the transfer bars 12 is supported on the upper side of the slide 62 by means of two sets of roller supports 70 which are journaled on the slide and which contact gibs formed at 45 degree angles on a transfer bar support member 72, which bolted within the channel of the transfer bar 12. A rack 74 fixed to the underside of the member 72, makes contact with the gear 58 and thereby rotation of the shaft 48 is transmitted through the gear 58 so as to cause a transfer bar 12 to move in an axial direction.

The box 50 is substantially identical to box 52 and the rotation of shaft 48 passes through box 50 causing it to reciprocate the transfer bar 10, which it supports, in synchronism with the reciprocation of bar 12. The other ends of the transfer bars 10 and 12 are supported by drive boxes 80 and 82 which are substantially similar to the boxes 50 and 52 except that they do not provide power to their equivalent supports of the transfer bars 10 and 12.

In the preferred embodiment of the invention, the lateral movement of the transfer bars 10 and 12 toward and away from one another is powered by the operating press 18. The press employs a pair of driving cams 84 that are moved up and down with the ram of the press 18. One of the cams is disposed adjacent to the drive box 50 and the other of the cams 84 is disposed adjacent to the drive box 52. Their manner of powering the lateral motion of the transfer bars 10 and 12 is identical and only the operation of the cam 84 which is adjacent to the box 52 will be disclosed.

The cam 84 bears against a roller 86 rotatably journaled on the end of a rod 88. The rod 88 is rectangular in cross-section and passes through an open slot formed in the top of the base 64 of the drive 52. A cover plate 90 forms the top of the drive 52 and covers the top of the slot. The rod 88 makes a sliding fit with the slot and its extreme end extends out of the far side of the drive 52. This end is connected by a short section 92 to an extension 94 which extends parallel to the transfer bars 10 and 12 and connects at the other end to a bar 96 which is slidingly fitted in a slot in the drive 82. The other end of the rod 96 is connected to the rod of a pneumatic cylinder 98.

Air pressure is maintained on the cylinder 98 so as to bias its rod toward extension so that the roller 86 continually bears against the cam 84. This air pressure is sufficiently low so that when the press ram descends the cam 84 forces the rod back in the direction of the cylinder 98. As seen in FIGURES 4 and 6, the section of the rod 88, disposed within the drive 52, has a central notch 100 in its side. A roller follower 102 is disposed within this notch and rotatably supported on the short arm of a lever 104. The lever 104 is itself fixed on a vertical shaft 106 journaled by a pair of ball bearings 108 and 110 in the base 64 and upper plate 90 of the drive 52. The longer arm of the lever 104 rotatably supports another downwardly directed roller follower 112 which is disposed within a slot 114 formed in the upper surface of the slide member 62.

A sliding of the rod 88 resulting from the motion of the cam 84 produces a pivoting of the lever 104 through the cam follower 102 following the motion of the slot 100. This in turn causes the slide 62 to move laterally with respect to the motion of the rod 88. The transfer bar 12 is supported on the slide 62 and follows its lateral movement. Simultaneously a similar mechanism in the drive 82 moves the other end of the transfer bar 12 in a lateral direction.

The cam 84 associated with the drive 50 produces a similar motion of a bar 116 which connects to the drive 80. The far end of this bar is connected to the rod of a pneumatic cylinder 118 which maintains the bar against the surface of the cam 84.

The arrangement is such that when the ram of the press descends, it causes the two transfer bars 10 and 12 to move laterally away from one another and when the ram raises, the two bars 10 and 12 move toward one another.

The two extremes of motion of the lever 104 are illustrated in FIGURE 4 by the two positions 104 and 104A. Similarly, the extreme of motion of the transfer bar 12 in the lateral direction is illustrated in FIGURE 6 by the numeral 12A.

The rotation of the basic drive device 20 is synchronized with the motion of the press so that the lateral movements of the transfer bars 10 and 12 occur during the dwells in the axial motion of the transfer bars. The resultant combined motion is in the desired rectangular pattern.

It is therefore seen that this unique drive mechanism for the transfer bar achieves the objects set forth in the preamble hereto.

Having thus described my invention, I claim:

1. A drive mechanism for a transfer system employing a pair of elongated transfer bars disposed parallel to one another and supported for axial movement and lateral movement toward and away from one another, and used in connection with an operating machine having a rotary power drive, comprising:

a cam powered by said rotary drive, said cam being formed in two parts, said two parts being adjustable relative to one another so as to adjust the distance between the ends thereof;

a cam follower associated with said cam so as to undergo a reciprocating motion with dwells at each extreme of its travel as the cam rotates;

gear means connecting said cam follower to said transfer bars so as to reciprocate said transfer bars axially with dwells at each extreme of their motion as the cam rotates;

and means driven by said operating machine causing said transfer bars to reciprocate in a direction perpendicular to their length, toward and away from one another, during the dwells of said axial motion, in timed relation to the motion of said operating machine.

2. The structure of claim 1 wherein said cam comprises a barrel cam supported on a central axis and formed in two parts, each containing one of the sections of the cam which provides the dwell to the cam follower, whereby the axial orientation of the cam halves on the shaft may be adjusted so as to adjust the distance between the dwell points.

3. A drive mechanism for a work transfer device having a pair of transfer bars disposed parallel to one another and containing a plurality of sets of fingers disposed in opposition to one another, said transfer device being associated with an operating machine having a rotary power drive, comprising:

a reciprocating drive mechanism powered by said rotary drive and operative to provide as an output a rotary reciprocation with a dwell at each extreme of the rotation;

gear means connecting the output of said reciprocating drive mechanism to said transfer bars so as to reciprocate said transfer bars axially with dwells at each extreme of their motion;

cam means connected to said operating machine so as to reciprocate toward and away from transfer bars in timed relation to the motion of said operating machine;

at least four lateral drive units disposed along the lengths of said transfer bars, with one lateral drive unit being disposed adjacent to each end of each of said transfer bars;

and means for powering said lateral drive units from said cam so as to cause the transfer bars to reciprocate in a direction perpendicular to their extension, toward and away from one another, during the dwells of said axial motion, in timed relation to the motion of said operating machine.

4. A drive mechanism for a work transfer device having a pair of transfer bars disposed parallel to one another and containing a plurality of sets of fingers disposed in opposition to one another, said transfer device being associated with an operating machine having a rotary power drive, comprising:

a reciprocating drive mechanism powered by said rotary drive and operative to provide as an output a rotary reciprocation with a dwell at each extreme of the rotation;

gear means connecting the output of said reciprocating drive mechanism to said transfer bars so as to reciprocate said transfer bars axially with dwells at each extreme of their motion;

lateral drive means disposed at each end of each of the transfer bars;

cams attached to the operating machine so as to reciprocate toward and away from said transfer bars in timed relation to the motion of said operating machine;

connecting rods passing through each of said lateral drive means and abutting said cam means, said connecting rods being so connected to said lateral drive means that the reciprocation of said rods cause a reciprocation of said transfer bars toward and away from one another;

and means for biasing said connecting rods against said cams so as to cause said connecting rods to reciprocate in timed relation to the reciprocation of said cams.

5. A drive mechanism for a transfer system employing a pair of transfer bars disposed parallel to one another and supported for axial movement and lateral movement toward and away from one another, and used in connection with an operating machine having a rotary power drive, comprising:

a cam powered by said rotary drive;

a cam follower associated with said cam so as to undergo a reciprocating motion with dwells at each extreme of its travel as the cam rotates;

gear means connecting said cam follower to said transfer bars so as to reciprocate said transfer bars axially with dwells at each extreme of their motion as the cam rotates;

cams attached to the operating machine so as to reciprocate toward and away from said transfer bars in timed relation to the motion of said operating machine;

a pair of slide rods disposed parallel to the transfer bars on opposite sides thereof, each having one end abutting one of said cams;

pneumatic power means connected to the opposite end of each of said slide rods so as to force said slide rods against said cams;

and linkage members connected to said slide bars to said transfer bars and operative to cause said transfer bars to reciprocate laterally as said slide bars reciprocate under the power of said cams during the dwells of the transfer bars axial reciprocations.

References Cited by the Examiner

UNITED STATES PATENTS

| | | | |
|---|---|---|---|
| 2,861,676 | 11/1958 | Rasmussen et al. | 198—19 X |
| 2,929,485 | 3/1960 | Wallis | 198—19 |
| 2,934,194 | 4/1960 | Adams | 198—19 |
| 3,077,259 | 2/1963 | Braun | 198—218 |
| 3,135,395 | 6/1964 | Wallis | 198—19 X |
| 3,151,735 | 10/1964 | De Gain | 198—218 |

EVON C. BLUNK, *Primary Examiner.*

SAMUEL F. COLEMAN, *Examiner.*

R. KRISHER, *Assistant Examiner.*